United States Patent [19]

Quayle et al.

[11] Patent Number: 4,931,550
[45] Date of Patent: Jun. 5, 1990

[54] LITHIUM SALT OF COPPER COMPLEX MONOAZO DYE

[75] Inventors: Arthur Quayle, Bury; Cecil V. Stead, Manchester, both of England

[73] Assignee: Imperial Chemical Industries PLC, London, England

[21] Appl. No.: 46,200

[22] Filed: May 5, 1987

[30] Foreign Application Priority Data

May 13, 1986 [GB] United Kingdom ............... 8611637
Jul. 16, 1986 [GB] United Kingdom ............... 8617372

[51] Int. Cl.$^5$ ................ C09B 45/08; C09B 45/18; C09D 11/02; C09D 11/16
[52] U.S. Cl. ................................. 534/724; 534/583; 534/573; 106/22
[58] Field of Search ................... 534/724, 583; 106/22

[56] References Cited

U.S. PATENT DOCUMENTS

| | | | |
|---|---|---|---|
| 2,754,294 | 7/1956 | Hein et al. | 534/724 X |
| 3,655,640 | 4/1972 | Hoare | 534/583 X |
| 4,002,424 | 1/1977 | Smith | 534/583 X |
| 4,071,312 | 1/1978 | Blackwell | 534/583 X |
| 4,707,545 | 11/1987 | Meininger et al. | 534/583 X |

FOREIGN PATENT DOCUMENTS 521812 2/1956 Canada ...................... 534/724

OTHER PUBLICATIONS

Basargin et al. I, Chemical Abstracts, vol. 71, #56363d, (1969).
Basargin et al. II, Chemical Abstracts, vol. 81, #177703e (1974).
Formula Index, Chemical Abstracts, Collective Index 1972–1976, p. 8211F.

Primary Examiner—Floyd D. Higel
Attorney, Agent, or Firm—Cushman, Darby and Cushman

[57] ABSTRACT

The dye of the formula:

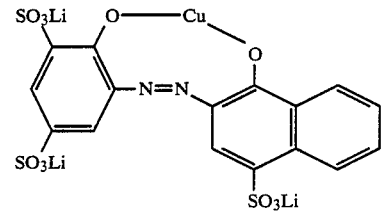

which is suitable for use in aqueous inks, especially for ink jet printing.

1 Claim, 1 Drawing Sheet

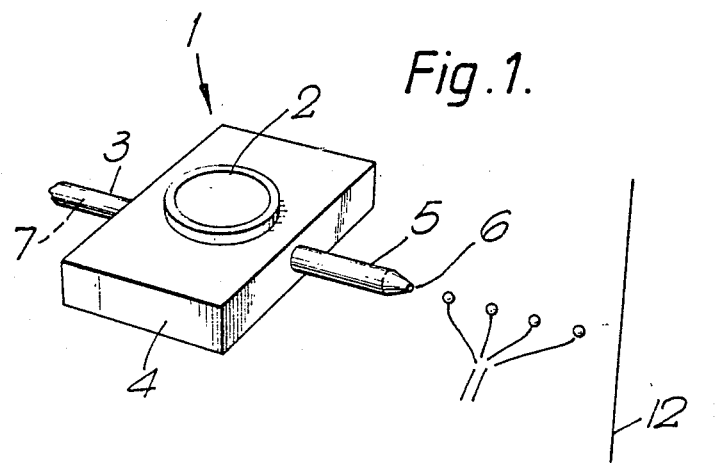
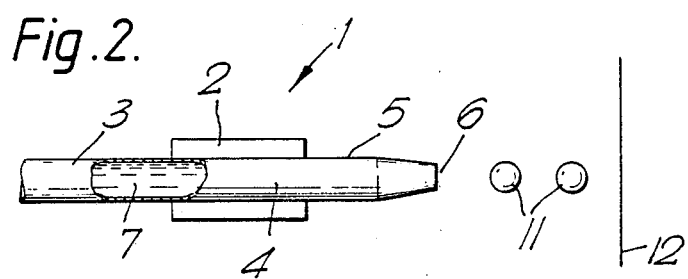
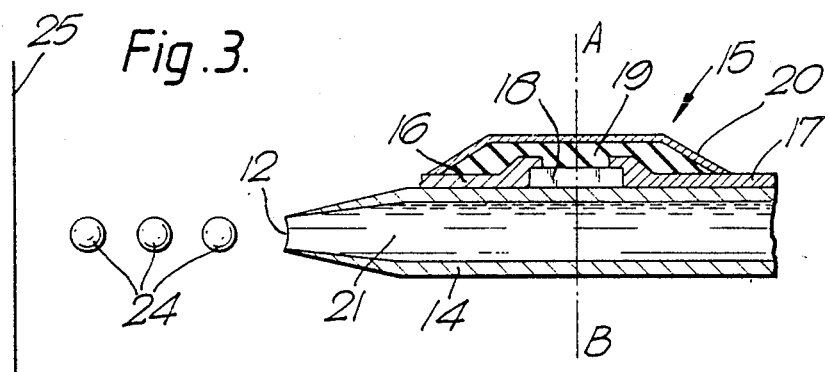
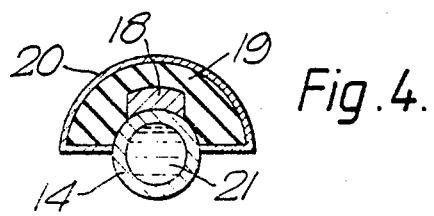

LITHIUM SALT OF COPPER COMPLEX MONOAZO DYE

This specification describes an invention relating to a water-soluble azo dye and to the use thereof in an ink suitable ink jet printing.

According to the present invention there is provided the dye of the formula:

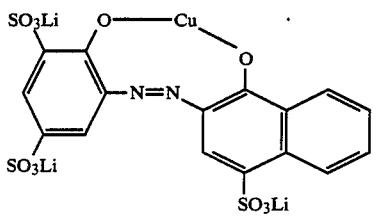

The dye of Formula I has excellent lightfastness and adequate substantivity on cellulosic materials, especially paper, and good solubility in water and polar solvents. It is therefore adapted for use in writing and printing inks based upon water or water-miscible solvents, such as lower alcohols and glycols. It has been found that water-based inks containing the dye of Formula I are particularly suitable for use in ink jet printing wherein an ink is ejected from an orifice of a recording head in the form of liquid droplets.

For recording on paper or the like with writing tools (fountain pen, felt pen, etc.), it is conventional to use an ink which is a solution of a dye in water or a water miscible organic solvent and an ink of similar composition is also used in ink-jet printing.

In ink-jet printing, droplets of ink are generated in various ways and deposited on a substrate to effect a record. A suitable ink comprises, as essential components, a recording agent (usually a dye or a pigment) and a liquid vehicle (usually water, an organic solvent or mixtures thereof) and, as optional components, various other additives.

Ink-jet printing may be classified into various systems depending on the method for generation of ink droplets and the method for controlling the flight direction of ink droplets. An example of a device in accordance with one system is shown in FIG. 1.

The device shown in FIG. 1 operates by providing a printing signal at the print head section having a piezoelectric oscillator and generating ink droplets corresponding to said signal. In FIG. 1, a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is applied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

An example of another type of device using the same system is shown in FIG. 2, in which a tubular liquid chamber 4 links the inlet and outlet lines 3, 5 and a cylindrical piezoelectric oscillator 2 is arranged around the outer peripheral portion of the chamber 4. The mechanism for generation of ink droplets is essentially the same as in the device as shown in FIG. 1.

In another system, charged droplets are continuously generated but only a proportion of the droplets are selected for recording.

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-sectional view taken on the line A-B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome heating resistor 18 the ends of the electrodes 16, 17 and the resistor 18 being encased in a layer of insulant 19 and a protective envelope 20.

In operation an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each corresponding to a electric pulse, directed at the substrate 25.

As ink-jet printing generates little noise and allows high speed multi-colour operation without the need for special dye fixation treatments, a number of different ink-jet printing systems are currently being intensively investigated.

An ink for any of the various types of ink-jet printing systems need to meet the following criteria:
(1) Physical properties of the ink, such as viscosity and surface tension, are each within a defined range.
(2) All solutes have good solubility in the ink medium to give solutions having good stability which do not plug the fine ejecting orifices (hereinafter referred to as "solution stability").
(3) The recording agent gives images of sufficient optical density.
(4) The ink does not change in physical properties or deposit solid matter during storage.
(5) Printing can be performed without a restriction on the nature of substrate on which a record is made.
(6) The ink exhibits a high rate of fixation.
(7) The ink gives images of good resolution and having good resistance to water, solvent (particularly alcohol), light, weather and abrasion.

However, images produced by conventional inks, particularly water-based inks, tend to form blots, dislocations or scratches, or to fade by water adhesion, mechanical friction, or exposure to light and an ink free from these drawbacks is an urgent requirement.

In addition to the above criteria, an ink for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed recording over a long period of time.

Although a number of inks have been proposed to overcome these problems, none have been produced which meet all the foregoing requirements.

According to a second feature of the present invention there is provided an ink comprising the water-soluble dye of Formula I.

It is possible, by use of a dye in accordance with Formula I to obtain an ink having an improved solution stability, particularly during a prolonged storage in concentrated form, and having excellent recording properties, particularly ejection stability, ejection responsiveness, and continuous recording workability.

The present ink is of practical importance and gives images having good water resistance, alcohol resistance and light fastness.

The present ink preferably comprises the dye and a liquid medium, such as water, an organic solvent or a mixture thereof. The dye of the first feature of the present invention has especially good solution stability in the above-mentioned liquid medium, thereby improving the ejection stability of the ink and reducing the incidence of plugging of the ejecting orifice even after a long period of storage in the recording apparatus.

The amount of the dye in the ink is determined in accordance with the desired optical density of the image, the type of recording device to be used, other components to be added, the required physical properties of ink, etc. But generally speaking, a suitable dye content is in the range of 0.5–20%, preferably 0.5–15%, and especially 1–10%, by weight based on the total weight of the ink.

The present ink can contain, besides the dye of Formula I, other dyes selected from various types of known dyes such as direct dyes, acid dyes, and the like but preferably contain only the dye in accordance with the first aspect of the present invention or dyes having similar performance characteristics in ink jet printing.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethylformamide (DMF) and dimethylacetamide (DMA); ketones or ketone alcohols such as acetone and diacetone alcohol; ethers such as tetrahydrofuran and dioxane; nitrogen-containing heterocyclic ketones such as N-methyl-2-pyrrolidone (NMP) and 1,3-dimethyl-2-imidazolidinone (DMI); lower alkyl ethers of polyhydric alcohols such as 2-methoxyethanol (ME), 2-(2-methoxyethoxy)ethanol (MEE), 2-(2-ethoxyethoxy)ethanol (EEE), 2-[2-(2-methoxy-ethoxy)ethoxy]-ethanol (MEEE) and 2-[2-(2-ethoxyethoxy)ethoxy]ethanol (EEEE); and polyhydric alcohols, especially polyalkylene glycols such as polyethylene glycol (PEG) and polypropylene glycol (PPG), alkylene glycols and thioglycols containing $C_2$–$C_6$ alkylene groups, such as ethylene glycol (EG), propylene glycol (PG), butylene glycol (BG), triethylene glycol (TEG), thiodiglycol (TDG), hexylene glycol (HG) and diethylene glycol (DEG) and other polyhydric alcohols such as glycerol and 1,2,6-hexanetriol (HT).

Preferred water-soluble organic solvents among these are glycols and glycol ethers, such as EG, DEG, TEG, and MEEE; PEGs with molecular weights up to 500; and heterocyclic ketones such as NMP and DMI. Preferred specific solvent mixtures are a binary mixture of water and DEG and a tertiary mixture of water, DEG and NMP.

The present ink preferably contains from 5–95%, preferably 10–80%, and especially 20–50%, by weight of water-soluble organic solvent based on the total weight of the ink.

The present ink, prepared from the components mentioned above, is generally characterised by excellent and balanced recording performance characteristics i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine (DEA) and triethanolamine (TEA); and pH conditioners, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-retentivity of the ink at the tip of the ejecting orifice. When the present ink is used for ink-jet recording of the type based on the action of thermal energy, the thermal properties, e.g. specific heat, coefficient of thermal expansion, and heat conductivity, of the ink may be modified by suitable additives.

If the present ink is to be applied by means of a writing tool, e.g. a pen, it may be necessary to modify the viscosity and the other physical properties in relation to the affinity of the ink for the recording substrate.

The present ink represents a significant step towards satisfying all the requirements stated above, that is to say, to providing an ink which does not plug capillary tubes or ejecting orifices, does not result in deterioration or formation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, the present ink is particularly suitable for use in an ink jet recording process utilising thermal energy because of its good long term heat stability.

The present invention is further illustrated with reference to the following Examples in which all parts and percentages are by weight unless otherwise indicated.

EXAMPLE 1

2-Aminophenol-4,6-disulphonic acid (80.7 g, 0.3M) was stirred with water (900 ml) and diazotised at below 5° C. by the addition of concentrated hydrochloric acid (100 ml) and sodium nitrite (21 g) and the resulting diazonium salt was added to a mixture of 4-hydroxynaphthalene-1-sulphonic acid (67.2 g), water (1000 ml) and caustic liquor to bring to pH 10. The addition was carried out at 5° C. and maintained at pH 10 by the addition of caustic liquor.

On completion of coupling the pH was lowered to 5 with concentrated hydrochloric acid and the precipitate isolated by filtration. The paste was purified by stirring with a mixture of ethyl alcohol (1800 ml) and water (2000 ml). The product was filtered then washed with a mixture of ethyl alcohol (900 ml) and water (100 ml) and dried.

The solid dye was dissolved in water (1000 ml) and adjusted to pH 8 with a little caustic liquor. A solution of copper sulphate hydrate (75 g) in water (200 ml) was added over 15 minutes maintaining the pH at 8-9 by the addition of caustic liquor. The red suspension was salted to 20% with sodium chloride then filtered and pressed down.

The cake was stirred with water (500 ml) and dialysed to remove inorganic salts. After dialysis the red solution was stirred and a large excess of lithium chloride added (150 g). After stirring for 30 minutes the precipitate was filtered and the cake dialysed to remove inorganic salt. After dialysis the solution of dyestuff was screened through a 0.45 μm membrane and the liquor evaporated to give pure dye (lithium salt).

The structure of the dye, hereinafter referred to as Dye 1, is shown in Formula I. The dye is extremely soluble in water and water-miscible organic solvents. It has a solubility greater than 20% in water and 6:3:1 water:DEG:NMP and a solubility of 19% in 3:1 DEG:NMP.

EXAMPLE 2

An ink was prepared by dissolving 2 parts of Dye 1 in 98 parts of a mixture of 60 parts of water, 30 parts of diethylene glycol and 10 parts of N-methyl-2-pyrrolidone. The ink was filtered under pressure through a Teflon filter (pore size: 1 μm) and degassed under vacuo before assessment. The ink was assessed for the following four characteristics, $T_1$ to $T_4$ in a recording apparatus having an on-demand recording head (50 μm diameter ejecting nozzle, piezo-oscillator driving voltage: 60 V at 4 KHz). In each assessment the ink proved to be satisfactory.

$T_1$ - Prolonged Storage stability

The ink was sealed separately in a glass container and stored at $-30°$ C. and at 60° C. for 6 months. In each case there was no appreciable separation of any insoluble matter or any change in physical properties and colour.

$T_2$ - Ejection Stability

The ink was subjected to continuous recording tests at room temperature, 5° C., and 40° C. for 24 hours and gave high quality images constantly throughout the test period at each temperature.

$T_3$ - Ejection Responsiveness

The ink was subjected to intermittent ejection at two-second intervals and ejection after standing for two months and showed stable uniform recording without causing plugging of the orifice.

$T_4$ - Quality of Recorded Image

A print on a standard plain paper was sharp and clear with good optical density. The image produced had a light fastness of 5 (blue scale) on exposure to a xenon UV lamp.

Equivalent inks to that described in Example 2 can be prepared using any of the following ink media in place of the medium described in Example 2.

| 1 | | 2 | |
|---|---|---|---|
| Water | (61) | Water | (62) |
| Glycerol | (25) | EG | (39) |
| TEA | (10) | HT | (5) |
| 3 | | 4 | |
| Water | (72) | Water | (68) |
| PG | (20) | MEEE | (30) |
| DMF | (5) | Polyoxyethylated | |
| | | 4-nonylphenol (0.1) | |
| 5 | | 6 | |
| Water | (72) | Water | (50) |
| PG | (20) | DEG | (25) |
| DMF | (5) | NMP | (20) |
| 7 | | 8 | |
| Water | (52) | Water | (61) |
| DEG | (30) | DEG | (20) |
| NMP | (15) | DMI | (15) |
| 9 | | 10 | |
| Water | (57) | Water | (50) |
| Ethanol | (10) | DEG | (20) |
| Glycerol | (30) | NMP | (15) |
| Na dehydroacetate (0.1) | | PEG (MW 200) (10) | |
| 11 | | 12 | |
| Water | (67) | Water | (64) |
| DEG | (30) | EG | (30) |
| Me 4-hydroxybenzoate (0.1) | | PEG (MW 200) (3) | |
| 13 | | | |
| Water | (56) | | |
| DEG | (30) | | |
| MEEE | (10) | | |

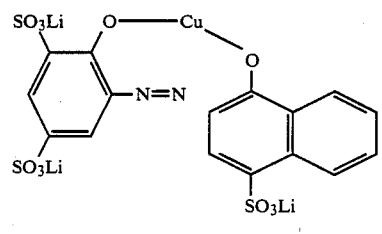

We claim:
1. The dye of the formula: